United States Patent [19]

Skeele

[11] 4,361,013
[45] Nov. 30, 1982

[54] PORTABLE REFRIGERATOR

[76] Inventor: Robert C. Skeele, 200 Waring Rd., Syracuse, N.Y. 13224

[21] Appl. No.: 243,553

[22] Filed: Mar. 13, 1981

Related U.S. Application Data

[63] Continuation-in-part of Ser. No. 129,429, Mar. 12, 1980, which is a continuation-in-part of Ser. No. 14,809, Feb. 26, 1979, abandoned, which is a continuation-in-part of Ser. No. 966,199, Dec. 4, 1978, abandoned.

[51] Int. Cl.³ .......................... F25B 41/04; F25D 3/10
[52] U.S. Cl. ......................................... 62/223; 62/294;
62/457; 62/514 R
[58] Field of Search .................. 62/457, 293, 292, 294,
62/514 R, 371, 223, 52; 236/101 R, 101 C, 93 R; 137/468

[56] References Cited

U.S. PATENT DOCUMENTS

| | | | |
|---|---|---|---|
| 2,496,816 | 2/1950 | Schlumbohm | 62/514 R |
| 2,742,927 | 4/1956 | Frumet, Jr. | 137/468 |
| 3,093,979 | 6/1963 | Ehrens et al. | 62/292 |
| 3,148,515 | 9/1964 | Jentis et al. | 62/294 |
| 3,456,455 | 7/1969 | Sapir | 62/514 R |
| 3,648,474 | 3/1972 | Moline | 62/514 R |
| 3,881,321 | 5/1975 | Riley | 62/293 |
| 4,129,432 | 12/1978 | Garside | 62/514 R |

Primary Examiner—Albert J. Makay
Assistant Examiner—Harry Tanner
Attorney, Agent, or Firm—Stonebraker, Shepard & Stephens

[57] ABSTRACT

A portable refrigerator 10 has a thermostat system that keeps the temperature of the refrigerator chamber 13 cool by allowing vapor to escape from an opening in a container 16 of pressurized liquid positioned inside chamber 13. A thermally expandable and contractible support in thermal communication with container 16 has a mount fixed relative to the container and a movable end disposed near the top of the container and carrying an element that opens and closes the vapor opening. The position of the movable end and the opening and closing of the vapor opening are then determined by the temperature of container 16. The vapor opening opens when chamber 13 warms container 16 and the support to an upper threshold temperature. The escaping vapor then rapidly lowers the temperature of container 16 and the support to a substantially lower threshold temperature at which the vapor opening closes.

9 Claims, 8 Drawing Figures

PORTABLE REFRIGERATOR

RELATED APPLICATION

This application is a continuation-in-part of my parent application Ser. No. 129,429. The history of the related applications is as follows, each application being entitled PORTABLE REFRIGERATOR and each predecessor application being abandoned upon the filing of the succeeding application.

| Sn. No. | Filed | |
|---------|---------|----------|
| 966,199 | 12/04/78 | Original |
| 014,809 | 2/26/79 | CIP |
| 129,429 | 3/12/80 | CIP |

BACKGROUND OF THE INVENTION

Portable refrigerators small enough to carry in a pocket have been suggested for cooling small quantities of material such as insulin and allergy medicine that must be kept at cool temperatures for proper preservation. Such small scale refrigerators have used a small container of a pressurized liquid that can be vaporized into the cooling chamber, but regulating the temperature in a simple and reliable way and extending the cooling capacity for a practical length of time with a small quantity of coolant has not been achieved.

On a larger scale, portable refrigerators for recreational uses such as camping, boating, and travel can also be cooled effectively by vapor escaping from a container of pressurized liquid, so long as a simple thermostat system can regulate the cooling temperature. This can avoid the bother of melting ice that is usually used for portable refrigerators.

This invention involves recognition of the problems of vapor-cooled portable refrigerators and proposes a regulating system that is simple, compact, and reliable and attains a lengthy cooling period from a small supply of coolant. The invention aims at low cost, convenience, long-range capacity, and reliable operation for a thermal regulating system for a small portable refrigerator.

SUMMARY OF THE INVENTION

The inventive thermostat system controls the temperature of a refrigerator chamber by regulating the escape of vapor from a top opening in a container of pressurized liquid positioned within the chamber. The vapor opening is opened and closed by a plunger carried on a movable end of a support having a mount fixed relative to the container so that the movable end is in the region of the top of the container. The support is formed of a thermally expandable and contractible material and is in thermal communication with the container so that the movable end moves in response to the temperature of the container. This arrangement opens the vapor opening when the chamber warms the container and the support to an upper threshold temperature and closes the vapor opening after escape of vapor from the container lowers the temperature of the container and the support to a lower threshold temperature substantially below the temperature of the chamber.

DRAWINGS

DETAILED DESCRIPTION

Figure 1:
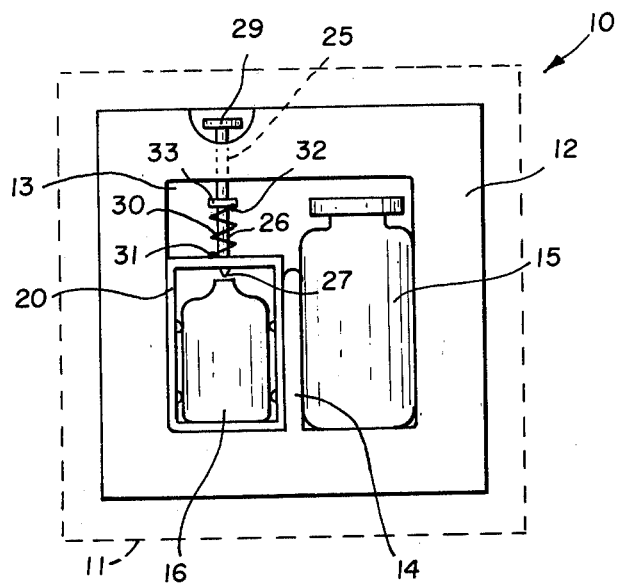
FIG. 1 is a partially schematic plan view of a preferred embodiment of the inventive refrigerator with a cover removed.

The invention can be applied to any portable refrigerator having a chamber cooled by vapor escaping from an opening in a container of pressurized liquid positioned within the chamber. This can include a small refrigerator package 10 as shown in FIG. 1 for insulin or allergy medicines in bottle 15 or to larger portable refrigerators for camping, picnicking, fishing, hunting, boating, beverage cooling, etc. These can be formed as thermally insulated boxes of various sizes having a cooling chamber 13 storing a container 16 of pressurized liquid. Although many different materials and constructions can be used, the small refrigerator package 10 as shown in FIG. 1 with cover 11 removed, includes a base 12, having a chamber 13 partially divided by a partition 14 to separate a space for storing bottle 15 and container 16.

The cooling is accomplished by liquid stored under pressure within container 16 and evaporated on demand into chamber 13 to keep chamber 13 cool. Container 16 rests in the cooling chamber along with the material to be cooled so that evaporation of liquid from container 16 not only keeps the stored material cool but also cools container 16 and its cooling liquid to lower the pressure within container 16. This helps regulate the system by maintaining a relatively low and nearly constant pressure within container 16 by using the coolant effect of evaporation of liquid from container 16 to keep container 16 and its liquid cool. The relatively low pressure in the cooled container 16 makes valve closure easier and more reliable as explained more fully below and also uses the cooling of container 16 and its liquid in response to vaporization to help cool chamber 13. Container 16 and its coolant liquid do not reach the higher temperatures and pressures they would attain if stored outside of chamber 13, and the cooling system only has to make up losses that occur as thermal energy leaks into package 10.

Container 16 is an active component of the inventive thermostat system for controlling the temperature within portable refrigerator 10. A vapor opening in container 16 is opened and closed periodically as required to maintain a cool temperature in chamber 13, and the element that opens and closes the vapor opening is positioned by an expandable and contractible support in close thermal communication with container 16. The support has a mount that is fixed relative to the container and a movable end disposed near the top of container 16, and the position of the movable end of the support is influenced predominantly by the temperature of container 16.

Container 16 and the movable support tend to reach the same temperature as chamber 13, especially as energy leaks into chamber 13 and gradually raises its temperature. When an upper threshold temperature is reached, container 16 and the expandable support are warm enough to open the vapor passageway and let vapor escape from chamber 16. This lowers the temperature and pressure of container 16 as the escaping vapor withdraws latent heat, and container 16 quickly becomes far cooler than chamber 13. In turn, container 16 quickly cools the nearby support in thermal communication with it so that the support contracts and moves to close the vapor opening. This occurs at a lower threshold temperature substantially below the temperature of chamber 13. Thereafter, the relatively cool container 16 withdraws energy from the warmer chamber 13 so they approach a common temperature and gradually warm to the upper threshold temperature to repeat the process.

Such a thermostat system using container 16 as an active component delivers a short burst of escaping vapor and quickly recloses container 16 to maintain a reasonably steady and cool temperature in chamber 13 over an extended period of time. Several preferred arrangements for making this work are described below.

As shown in FIG. 1, the cooling liquid container is held in a yoke 20 that accurately positions container 16 relative to a regulating valve. Yoke 20 can be formed in many different ways to accomplish its general function of being fixed relative to container 16 and holding a valve that regulates the evaporation of liquid from container 16. Yoke 20 is also preferably in thermal contact with container 16 and is a good heat conductor for helping the temperature of container 16 to predominately influence a bimetallic support element 30 that controls valve operation.

A plunger 25 mounted on yoke 20 can move axially of its stem 16, which has a needle point 27. Container 16 has a manually puncturable seal 28 at its upper end, and needle point 27 on plunger 25 is arranged for puncturing seal 28 when plunger 25 is pressed downward against container 16. The upper end of plunger 25 has a knob 29 that can be operated by a finger for pressing plunger 25 downward to drive needle point 27 through seal 28.

Needle point 27 then serves as a needle valve relative to the hole that needle point 27 makes in seal 28 when manually pressed through seal 28. Bimetallic support element 30 formed as a helix wound around stem 26 of plunger 25 axially adjusts the position of stem 26 in response to temperature of container 16 and thereby adjusts the position of needle point 27 relative to seal 28 to regulate the escape of vapor from container 16. One end 31 of bimetallic element 30 is fixed to yoke 20, and the other end 32 of bimetallic element 30 is movable and fastened to a collar 33 on stem 26. Support element 30 is both close to and in thermal communication with container 16 so that its temperature approximates that of container 16, and its movable end on collar 33 moves in response to the temperature of container 16. Then as container 16 warms and cools, bimetallic element 30 expands and contracts to move in the axial direction of stem 26 for raising and lowering needle point 27 from its seat in seal 28 so that needle point 27 acts as a needle valve that is temperature responsive under the control of element 30.

In operation, bottle 15 with its material to be cooled is positioned in chamber 13, and a sealed container 16 is positioned within yoke 20 and actuated by pressing on button 29 to drive needle point 27 through seal 28. Chamber 13 is covered and its temperature is cooled and regulated by bimetallic support element 30 controlling needle valve 27 in seal 28 to control the vaporization of liquid from container 16.

An upper temperature threshold reached as container 16 and support element 30 approach the warming temperature of chamber 13 causes element 30 to expand enough to open the valve and let cooling vapor into chamber 13. This quickly cools container 16 and support element 30 well below the ambient temperature in chamber 13 to a lower temperature threshold at which element 30 contracts sufficiently to close the valve. This produces relatively small overshoot and undershoot from a desired temperature setting within chamber 13. After the valve closes and vapor stops escaping, container 16 can continue to draw energy from chamber 13 and lower the temperature further. Container 16 and chamber 13 gradually approach the same temperature which gradually rises as energy leaks into chamber 13 to reach the upper temperature threshold and repeat the cycle.

Figure 2:
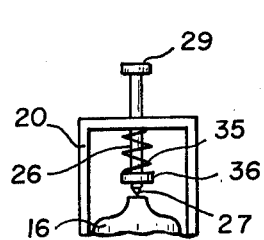
FIGS. 2 and 3 are fragmentary plan views of alternatives to the arrangement shown in FIG. 1.
Figure 3:
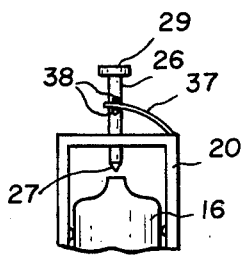
Figure 4:
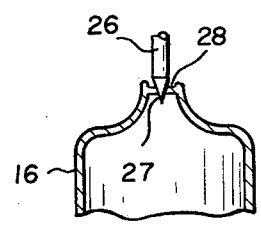
FIG. 4 is an enlarged, cross-sectional view of a needle valve cooperating with a puncturable seal according to the invention.

Alternative arrangements for bimetallic support elements are shown in FIGS. 2 and 3. A support element 35 wound in a helix around plunger stem 26 extends between yoke 20 and a collar 36 on stem 26 above needle point 27 to operate in a similar way to bimetallic element 30. Element 30 as shown in FIG. 1 contracts and pulls stem 26 downward toward container 16 upon cooling to close needle valve 27 and expands to lift needle valve 27 upon warming. Bimetallic element 35 as shown in FIG. 2 expands axially to push needle valve 27 down against container 16 as its temperature drops and axially contracts to lift needle valve 27 as temperature rises.

A bimetallic arm 37 fastened to yoke 20 as schematically shown in FIG. 3 extends between a pair of pins 38 on stem 26 at an appropriate orientation to raise and lower needle point 27 relative to container 16 in response to temperature variations. Other arrangements of bimetallic elements can also be used for axially positioning stem 26 to operate needle valve 27 reliably relative to seal 28 in container 16.

Figure 5:
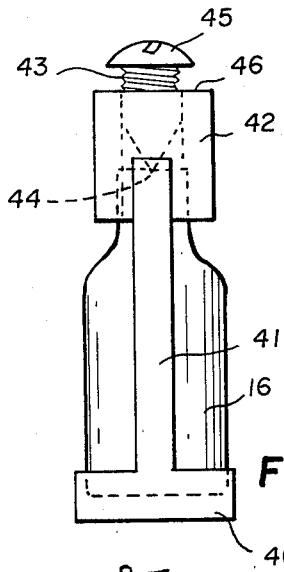
FIG. 5 is a side elevational view of another preferred embodiment of a thermostatic regulator system for my portable refrigerator.
Figure 6:
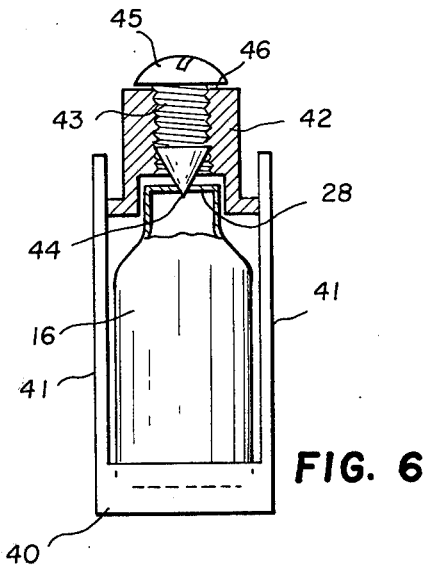
FIG. 6 is a partially cutaway, front elevational view of the regulator of FIG. 5.

FIGS. 5-8 show thermally expandable and contractible supports for operating a needle valve as previously explained without requiring a bimetallic element. As best shown in FIGS. 5 and 6, a support including a base 40 fixed relative to the bottom of container 16 and a frame formed of bars 41 extending to the top of container 16 is preferably formed of aluminum or other material having a high coefficient of thermal expansion. Both base 40 and bars 41 are either in contact with or close to container 16 to maintain thermal communication with chamber 16 to move responsively to the temperature of container 16. This makes bars 41 lengthen and shorten as the temperature of container 16 changes. A yoke 42 connected between bars 41 above the top of container 16 supports plunger 43 with its needle point 44 to move up and down relative to container 16 as bars 41 lengthen and shorten.

In the embodiment of FIGS. 5 and 6, plunger 43 is simply a pointed screw threaded into yoke 42 above container 16. Screwhead 45 is above the top 46 of yoke 42 as shown in FIG. 5, holding needle 44 above seal 28 of bottle 16. To activate container 16 for refrigerating chamber 13, screw 43 is advanced until head 45 seats against yoke surface 46, driving needle point 44 through seal 28. Thereafter, needle point 44 moves up and down slightly relative to seal 28 in response to expansion and contraction of aluminum bars 41 to regulate the temperature of chamber 13.

Support base 40 and frame bars 41 can be formed in many other ways to engage the base of container 16 and support yoke 42 over the top of container 16. The possibilities include bolts, threaded rods, cylindrical bars, molded or machined supports, or an aluminum cylinder or can surrounding and extending along the length of container 16 and supporting yoke 42 over the top of container 16. Also, yoke 42 can have different shapes and be connected in different ways to the top of the support. The coefficient of thermal expansion of the support should be larger than the coefficient of thermal expansion of container 16 so that the support moves needle 42 relative to seal 28 as container temperature changes.

Figure 7:
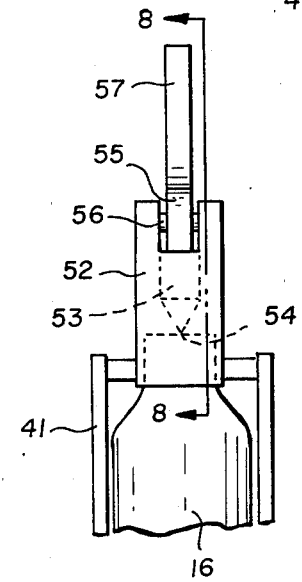
FIG. 7 is a fragmentary front elevational view of an alternative preferred thermostatic regulator for my portable refrigerator.
Figure 8:
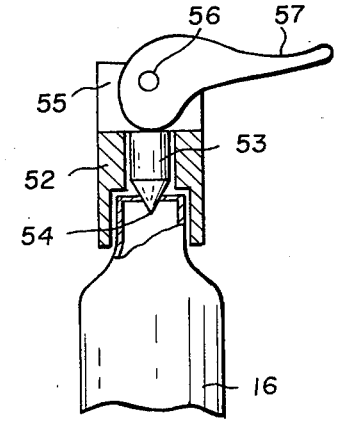
FIG. 8 is a cross-sectional view of the embodiment of FIG. 7, taken along the line 8—8 thereof.

The embodiment of FIGS. 7 and 8 shows a different form of yoke 52 connected between support bars 41 and having a different actuator for plunger 53 with its needle point 54. A cam 55 pivoted on a pin 56 near the top of yoke 52 has an operating lever or handle 57 arranged so that when handle 57 is pressed downward from the position of FIG. 7 to the position of FIG. 8, cam 55 drives plunger 53 downward to press needle point 54 through the seal in container 16. Cam 55 insures that plunger 53 moves to the same position relative to container 16 for each actuation. Then yoke 52 moves slightly in response to temperature variation allowing needle 54 to regulate the vaporization of liquid from container 16 as previously explained.

The invention applies to many sizes of portable refrigerators from pocket size on up. A coolant container within the cooling chamber and a thermally responsive needle valve regulating evaporation of the coolant can be applied to portable refrigerators for boats, vehicles, and a multitude of other uses.

I claim:

1. A thermostat system for controlling the temperature of a refrigerator chamber cooled by vapor escaping from an opening in a container of pressurized liquid positioned in said chamber, said thermostat system comprising:
    a. a thermally expandable and contractible support frame fixed relative to the base of said container with a movable end extending to the region of the top of said container;
    b. said support being in thermal communication with said container so said movable end moves in response to the temperature of said container;
    c. means positioned by said movable end for opening and closing said vapor opening; and
    d. said positioned means being arranged for opening said vapor opening when said chamber warms said container and said frame to an upper threshold temperature and for closing said vapor opening after escape of vapor from said container lowers the temperature of said container and said frame to a lower threshold temperature substantially below the temperature of said chamber.

2. The thermostat system of claim 1 wherein said positioned means is a plunger having a stem with a needle point that opens and closes said vapor opening.

3. The thermostat system of claim 2 including means for moving said plunger relative to said container for puncturing said container with said needle point to form said vapor opening.

4. The thermostat system of claim 1 wherein said frame is formed of a pair of aluminum bars extending along opposite sides of said container.

5. The thermostat system of claim 1 including a yoke connected to said frame and located over said top of said container.

6. The thermostat system of claim 5 wherein said positioned means is a plunger having a stem movably mounted in said yoke and a needle point arranged for opening and closing said vapor opening.

7. The thermostat system of claim 6 including means for moving said plunger relative to said yoke for puncturing said container with said needle point to form said vapor opening.

8. The thermostat system of claim 7 wherein said plunger is threaded into said yoke and is advanced to seated engagement with said yoke to puncture said seal.

9. The thermostat system of claim 7 including an actuator mounted on said yoke for moving said plunger relative to said yoke to puncture said seal.

* * * * *